United States Patent [19]

Wall et al.

[11] Patent Number: 4,507,201
[45] Date of Patent: Mar. 26, 1985

[54] TUBE PRESSURE FILTER

[75] Inventors: George W. Wall, Par; Glyn T. Jones, St. Austell, both of England

[73] Assignee: English Clays Lovering Pochin & Company, Ltd., Cornwall, England

[21] Appl. No.: 576,112

[22] Filed: Feb. 2, 1984

[30] Foreign Application Priority Data

Feb. 7, 1983 [GB] United Kingdom ................. 8303305

[51] Int. Cl.³ ........................................... B01D 29/10
[52] U.S. Cl. .................................... 210/232; 210/350; 210/445; 210/450; 100/211
[58] Field of Search ............... 210/808, 230, 350, 351, 210/352, 356, 232, 237, 238, 445, 450; 100/211

[56] References Cited

U.S. PATENT DOCUMENTS

| 1,502,552 | 7/1924 | Donnallan | 210/232 |
| 3,753,498 | 8/1973 | Gwilliam | 210/350 |
| 3,762,560 | 10/1973 | Gwilliam | 210/350 |
| 4,174,282 | 11/1979 | Butterworth | 210/232 |
| 4,228,012 | 10/1980 | Pall | 210/323.2 |
| 4,246,122 | 1/1981 | Keat | 210/350 |
| 4,277,338 | 7/1981 | Hoagland | 210/351 |
| 4,334,996 | 6/1982 | Broad | 210/350 |
| 4,366,055 | 12/1982 | Gwilliam | 210/350 |
| 4,430,232 | 2/1984 | Doucet | 210/232 |

FOREIGN PATENT DOCUMENTS

| 624196 | 7/1961 | Canada | 210/232 |
| 1366856 | 9/1974 | United Kingdom | 210/350 |
| 1460432 | 1/1977 | United Kingdom | 210/350 |
| 1515508 | 6/1978 | United Kingdom | 210/350 |
| 1514470 | 6/1978 | United Kingdom | 210/350 |
| 1582957 | 1/1981 | United Kingdom | 210/350 |
| 599823 | 3/1978 | U.S.S.R. | 210/232 |
| 719665 | 3/1980 | U.S.S.R. | 210/232 |

Primary Examiner—Ernest G. Therkorn
Attorney, Agent, or Firm—Stefan J. Klauber

[57] ABSTRACT

The inner assembly (2) of a tube pressure filter comprises a core (6) provided with a facing (36) made up of a plurality of laths. At the end of the core (6) there is an annular member (42, 44) which is retained in position between the facing (36) and a split retaining ring (60, 62). The retaining ring (60, 62) fits in a groove (58) in the core and is locked in position by locking elements (64) which fit into aligned recesses in the retaining ring (60, 62) and the annular member (42, 44) and are secured by screws (68).

10 Claims, 2 Drawing Figures

TUBE PRESSURE FILTER

BACKGROUND OF THE INVENTION AND PRIOR ART

This invention relates to a tube pressure filter.

Tube pressure filters are described, for example, in British Patent Specifications Nos. 907,485, 1,240,465 and 1,582,957, in British Patent Application No. 8301927, and in European Patent Specification No. 0036318. The inner assembly of a tube pressure filter generally comprises a central core and two end sections each of which has a sealing portion of diameter larger than the diameter of the central core, which portion closes one end of, and forms a seal with, an outer tubular assembly. A fairing is generally provided on each end section to effect a smooth change from the diameter of the sealing portion to the diameter of the central cylindrical section. The end sections also generally accommodate means for introducing a mixture of a particulate solid material and a liquid to be pressure filtered into the inner compartment of the tube pressure filter, means for removing filtrate which has passed through the filter element and means for introducing a compressed gas on the inner side of the filter element in order to assist the discharge of filter cake adhering to the outer side of the filter element.

The means for introducing the mixture to be pressure filtered into the inner compartment of the tube pressure filter generally comprises an annular orifice provided in the outer surface of at least one of the fairings.

Hitherto the inner assembly of a tube pressure filter has been constructed by welding to each end of a tubular steel member, comprising the core, an inner end cap in the form of a substantially circular steel plate. An outer end cap, to which an annular member, comprising the fairing, is secured by a plurality of screws, is then secured to each inner end cap by means of a plurality of studs and nuts. This method of construction has the disadvantages that a fluid tight weld capable of withstanding high pressures must be effected in order to join the inner end caps to the tubular steel member, and a weld of this type is expensive to execute and must be carefully inspected, and also that a large number of nuts must be undone whenever the outer end cap is removed in order, for example, to change the wire mesh sleeve which supports the filter medium.

SUMMARY OF THE PRESENT INVENTION

According to the present invention there is provided a tube pressure filter comprising an inner assembly and a generally tubular outer assembly which surrounds the inner assembly to provide between the assemblies an annular chamber which is divided into inner and outer compartments by an inpermeable diaphragm disposed within the outer assembly, a filter element disposed within the inner compartment, means for supplying a mixture of a liquid and a particulate solid to the inner compartment and means for supplying fluid under pressure to the outer compartment so as to cause the liquid in the inner compartment to be forced through the filter element leaving the particulate solid material disposed on the filter element, in which the inner assembly comprises a core and two end sections, at least one of the end sections comprising an annular member which is a sliding fit on the core, and a retaining device which engages the core and provides an abutment preventing displacement of the annular member off the end of the core, releasable locking means being provided for maintaining the retaining device in engagement with the core.

Preferably, the retaining device is a split ring which co-operates with an annular groove formed in the outer surface of the core.

The core preferably comprises a tubular metallic member, such as a length of steel tubing, but may also be substantially solid and may be made of wood, metal or a plastics, ceramics or a cementitious material, such as concrete. The outer surface of the central core is preferably so constructed as to provide means for locating each end section in its desired position.

Each end section may be made in the form of a single annular element or may be an assembly of two or more annular elements defining between them chambers and ducts for distributing the mixture to be pressure filtered around the periphery of the end section.

One or more seals are preferably provided between each end section and the central core to prevent leakage of fluids under the high pressures which prevail in the interior of the tube pressure filter.

An annular groove is preferably formed by machining adjacent the axially outer, or larger diameter, end of each end section, and the retaining device, in the form of a split ring consisting of two substantially semicircular portions, is shaped to fit snugly in each groove. The locking means for the split rings conveniently comprises cylindrical locking elements of a height similar to, or slightly larger than, the transverse width of the split ring, which members are located in circular depressions formed in the larger diameter end face of the end sections and are held in place by screws.

DETAILED DESCRIPTION OF A PREFERRED EMBODIMENT

Figure 1:
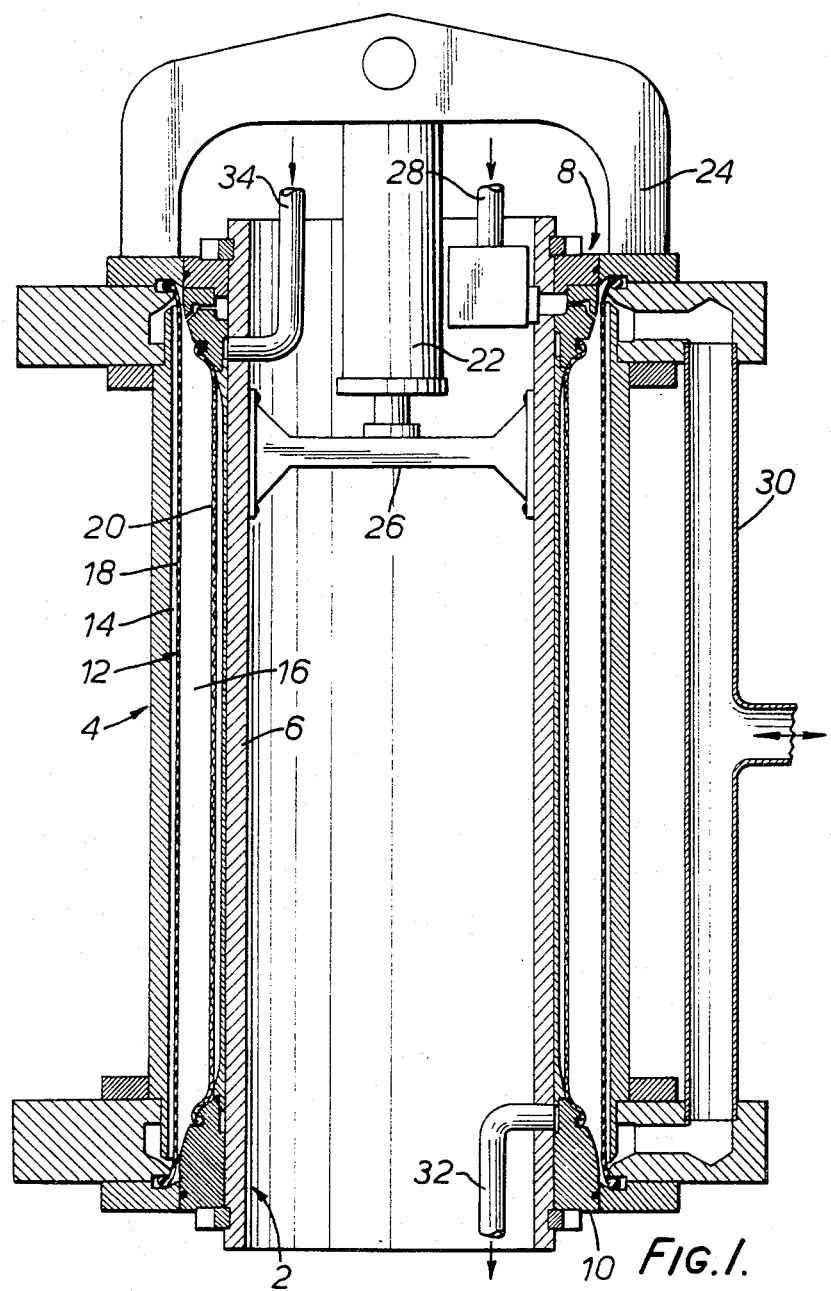
FIG. 1 is a sectional view of a tube pressure filter.

The tube pressure filter shown in FIG. 1 comprises an inner assembly 2 and a generally tubular outer assembly 4. The outer assembly 4 may be constructed in accordance with our co-pending patent application No. 8303306. The inner assembly 2 comprises a central core 6 in the form of a cylindrical member on which are mounted two end sections 8 and 10. In the position shown in FIG. 1, the end sections 8 and 10 are in sealing engagement with the outer assembly 4 to define an annular chamber 12 between the inner and outer assemblies 2 and 4. The chamber 12 is divided into two compartments 14 and 16 by a flexible, impermeable diaphragm 18 which is secured within the outer assembly 4. The outer surface of the inner assembly 2 is provided with a filter element 20.

A fluid operated ram 22 is mounted on a spider 24 which is rigidly fixed to the outer assembly 4. The piston rod of the ram 22 is connected by a crossbar 26 to the tubular member 6.

In operation of the tube pressure filter of FIG. 1, a mixture comprising a liquid and a particulate solid is fed into the inner compartment 16 through a feed conduit 28. When the inner compartment 16 is full, the supply of mixture is terminated by a power-operated shut-off valve accommodated in a housing 29 (FIG. 2) and fluid, such as water, is supplied under high pressure through an inlet manifold 30 to the outer compartment 14. The pressure of the water acting on the diaphragm 18 forces the liquid component of the mixture through the filter element 20 and it eventually flows to a filtrate outlet conduit 32. During this operation, the solid component of the mixture is deposited on the filter element 20 in the form of a filter cake.

At the end of the pressing operation, the water is withdrawn under vacuum from the outer compartment 14 through the manifold 30, and the ram 22 is actuated to lower the inner assembly 2 relatively to the outer assembly 4, which results in the inner compartment 16 communicating with the outside. Compressed air is then supplied through an inlet conduit 34, and this air passes to the region beneath the filter element 20 to cause the filter cake to be detached so that it falls from the tube pressure filter. The inner assembly 2 is then returned to the position shown in FIG. 1 by the ram 22, and the next cycle begins.

Figure 2:
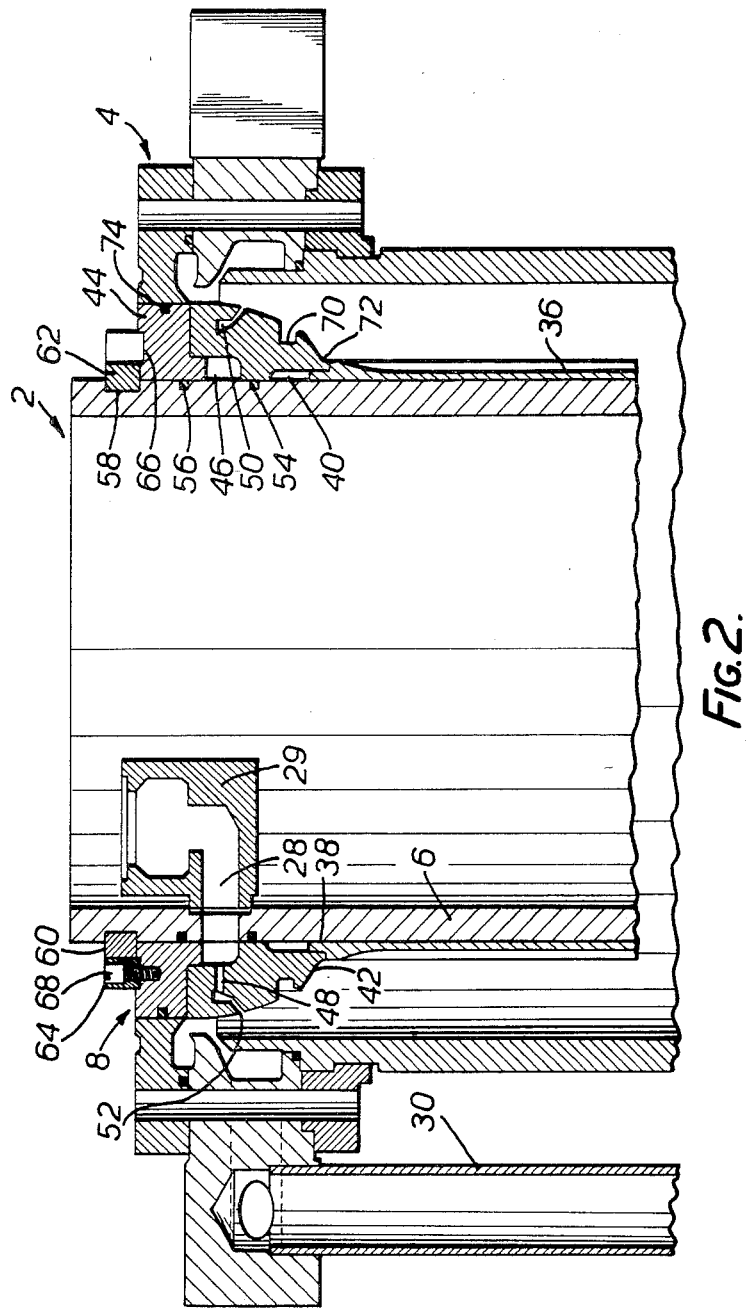
FIG. 2 is a sectional view of the top end of the tube pressure filter of FIG. 1 on an enlarged scale.

Referring to FIG. 2, the central cylindrical member 6 is provided with a facing 36 of longitudinally disposed laths each adjacent two of which define between them an outwardly opening narrow slot which communicates with a longitudinal duct for fluids as described in our copending British Patent Application No. 8301927. Each lath is provided with a spigot portion 38 which co-operates with a deep annular slot 40 formed in the smaller diameter end of the end section adjacent the outer surface of the central cylindrical member 6. The part of the slot 40 which is unoccupied by the spigot portions 38 serves as an annular chamber for distributing compressed gas around the longitudinal ducts formed in the facing of laths 36 for the purpose of discharging filter cake adhering to the surface of the filter element 20.

The end section 8 comprises an annular member made up of an axially inner annular element 42 and an axially outer annular element 44, both of phosphor bronze. The annular elements 42 and 44 define between them, and with the cylindrical member 6, an annular chamber 46 into which the mixture to be pressure filtered is introduced through the conduit 28. A plurality of radial ducts 48 connect the annular chamber 46 to a smaller annular cavity 50 from which the feed mixture can flow through a narrow annular slot 52 into the inner compartment 16 of the tube pressure filter. A groove 54 accommodates an O-ring which forms a seal between the inner annular element 42 and the central cylindrical member 6 and a groove 56 accommodates an O-ring which forms a seal between the outer annular element 44 and the central cylindrical member 6.

An annular groove 58 is machined in the central cylindrical member 6 adjacent the axially outer end of the end section 8 and a split ring, comprising two semicircular portions 60 and 62, fits snugly in this groove to retain the upper end section in position, the portions of the split ring being held in place by locking means comprising a plurality of cylindrical members 64, each of which is located in a circular depression 66 formed in the outer face of the end section and secured with a screw 68.

An annular groove 70 is formed in the fairing portion of the inner annular element 42 to facilitate the securing of an end of the cylindrical filter cloth sleeve which constitutes the filter element by tying with cord as described in British Patent Specification No. 1,598,425.

The inner end of the inner annular element 42 is machined at 72 so that its diameter in this region conforms to that of the facing 36 of the central cylindrical member 6. This avoids a step at the transition between the annular element 42 and the facing, which could cause damage to the filter element or the diaphragm. A groove 74 accommodates an O-ring which forms a seal between the outer element 44 and the outer tubular assembly 4.

The end section 10 at the bottom end of the central cylindrical member is similar to that at the top, but not identical. It is, however, retained on the cylindrical member 6 by a split ring in the same way as the top end section 8. The bottom end section 10 is formed in a single piece having the required passages and recesses to enable filtrate to pass to the conduit 32.

We claim:

1. A tube pressure filter comprising:
   an inner assembly;
   a generally tubular outer assembly which surrounds the inner assembly to provide between the assemblies an annular chamber;
   an impermeable diaphragm which is disposed within the outer assembly to divide the annular chamber into inner and outer compartments;
   a filter element disposed within the inner compartment;
   means for supplying a mixture of a liquid and a particulate solid to the inner compartment; and
   means for supplying fluid under pressure to the outer compartment so as to cause the liquid in the inner compartment to be forced through the filter element leaving the particulate solid material deposited on the filter element, the inner assembly comprising a core and two end sections, at least one of the end sections comprising an annular member which is a sliding fit on the core, and a retaining device which engages the core and provides an abutment preventing displacement of the annular member off the end of the core, the end section also comprising releasable locking means maintaining the retaining device in engagement with the core.

2. A tube pressure filter as claimed in claim 1, in which the retaining device comprises a split retaining ring.

3. A tube pressure filter as claimed in claim 2, in which the split retaining ring comprises two semicircular portions.

4. A tube pressure filter as claimed in claim 2, in which the core is provided with an annular groove in which the retaining ring is received.

5. A tube pressure filter as claimed in claim 2, in which the locking means comprises at least one locking element, and in which aligned recesses are provided in the retaining ring and the annular member, which recesses are engaged by the or each locking element.

6. A tube pressure filter as claimed in claim 5, in which fastening means is provided for retaining the or each locking element in position.

7. A tube pressure filter as claimed in claim 5, in which at least one said locking element is provided for each portion of the split retaining ring.

8. A tube pressure filter as claimed in claim 1, in which the core is provided with a facing on its outer surface, the annular member being disposed on the core between the facing and the retaining device.

9. A tube pressure filter as claimed in claim 1, in which the annular member comprises two annular elements which define between them an annular chamber for receiving the mixture of the liquid and the particulate solid, the annular member being provided with a passage for conducting the mixture from the annular chamber to the inner compartment.

10. A tube pressure filter as claimed in claim 1, in which the other end section comprises a further annular member which is retained on the core in substantially the same manner as the first-mentioned annular member.

* * * * *